United States Patent [19]

Yamamoto et al.

[11] Patent Number: 4,565,268
[45] Date of Patent: Jan. 21, 1986

[54] CLUTCH BRAKE MECHANISM FOR LAWN MOWER

[75] Inventors: Masaru Yamamoto, Hyogo; Tsuneyoshi Yuasa, Kakogawa, both of Japan

[73] Assignee: Kawasaki Jukogyo Kabushiki Kaisha, Kobe, Japan

[21] Appl. No.: 431,419

[22] Filed: Sep. 30, 1982

[30] Foreign Application Priority Data

Oct. 6, 1981 [JP] Japan ............................ 56-148974[U]

[51] Int. Cl.$^4$ ...................... B60K 41/24; F16D 67/02
[52] U.S. Cl. ................. 192/0.049; 192/0.094; 192/17 R; 56/11.3
[58] Field of Search ............... 192/12 R, 17 R, 0.094, 192/0.049, 113 A; 56/11.3, DIG. 3

[56] References Cited

U.S. PATENT DOCUMENTS

| | | | |
|---|---|---|---|
| 3,026,665 | 8/1959 | Hoff | 192/17 R |
| 3,838,558 | 10/1974 | Goodchild | 56/DIG. 3 |
| 4,309,862 | 1/1982 | Carlson | 192/0.094 |
| 4,326,368 | 4/1982 | Hoff | 192/17 R |
| 4,333,303 | 6/1982 | Plamper | 56/11.3 |

Primary Examiner—Rodney H. Bonck
Assistant Examiner—Alan G. Towner
Attorney, Agent, or Firm—Jordan and Hamburg

[57] ABSTRACT

A lawn mower including an engine having an output shaft, an air impeller, a plurality of cutter blades, and a driven shaft having the air impeller and the cutter blades connected thereto. The driven shaft is connected to the output shaft of the engine through a centrifugal clutch having a drum, and a brake band is located in a path of air drawn by suction by the air impeller for clamping against the outer periphery of the drum of the centrifugal clutch to interrupt rotation of the driven shaft.

1 Claim, 7 Drawing Figures

FIG.I
PRIOR ART
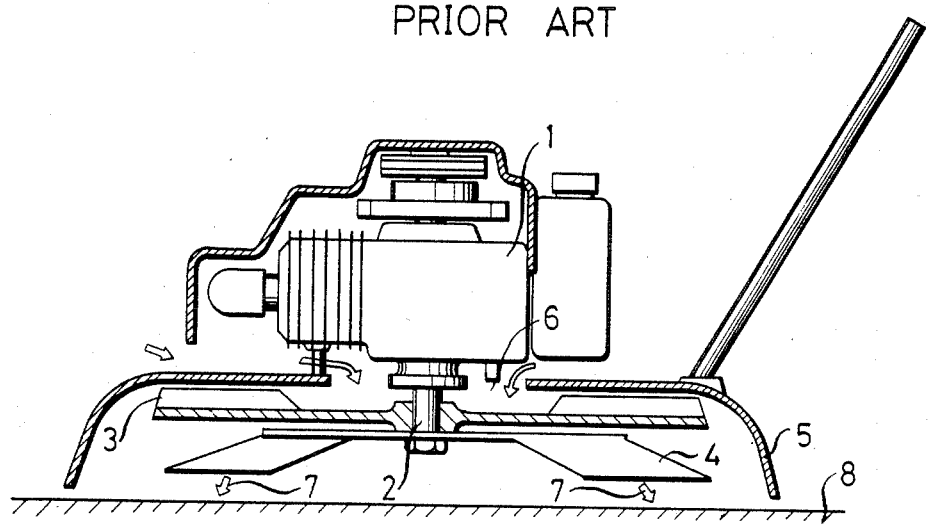
FIG.2
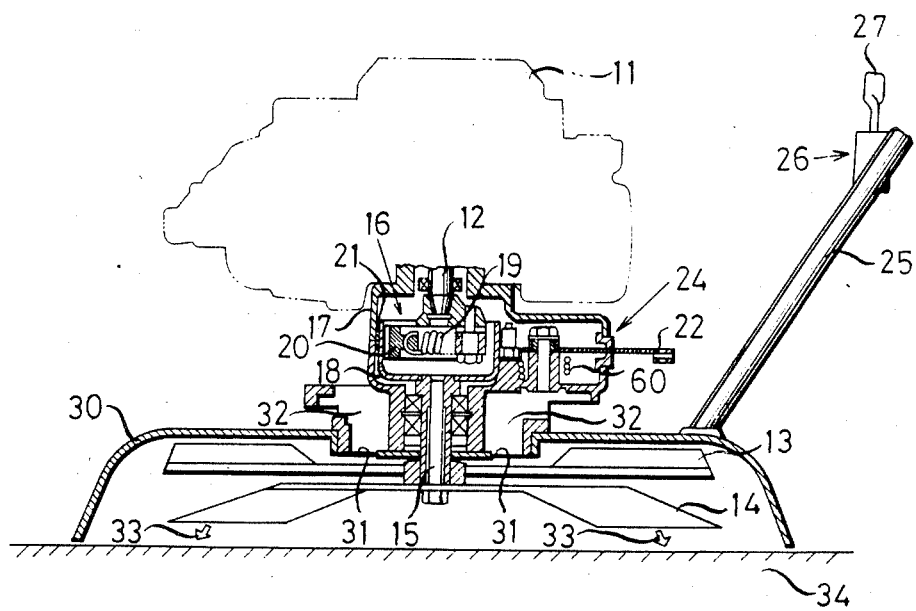

CLUTCH BRAKE MECHANISM FOR LAWN MOWER

BACKGROUND OF THE INVENTION

This invention relates to a clutch brake mechanism for a lawn mower of the floating type.

In one type of lawn mower of the floating type known in the art, an output shaft of an engine has an air impeller and cutter blades attached thereto. The air impeller and the cutter blades rotate as the engine is actuated, and the cutter blades cut grass on the ground while the air impeller draws air by suction and discharges air under high pressure to allow the lawn mower as a whole to float slightly in the air.

In the aforesaid construction, the engine should be shut down to stop the rotation of the cutter blades because the latter are directly connected to the output shaft of the former. Thus the lawn mower of the aforesaid construction has suffered the disadvantage that it is impossible to effect adjustments of the cutter blades during operation of the engine.

SUMMARY OF THE INVENTION

This invention has been developed for the purpose of obviating the aforesaid disadvantage of the prior art. Accordingly the invention has as its object the provision of a clutch brake mechanism for lawn mower capable of readily effecting adjustments of the cutter blades at all times.

According to the invention, there is provided a clutch brake mechanism for lawn mower comprising an engine having an output shaft, an air impeller, a plurality of cutter blades, and a driven shaft having the air impeller and the cutter blades connected thereto, characterized comprising a centrifugal clutch including a drum for operatively connecting the driven shaft to the output shaft of the engine, and a brake band mounted in a path of flow of air drawn by suction by the air impeller and operative to clamp against the outer periphery of the drum of the centrifugal clutch to thereby interrupt rotation of the driven shaft.

By virtue of this construction, according to cut off the connection between the outputshaft of the engine and the driven shaft and to stop the driven shaft with the brake band, the adjustment of the cutter blades can be easily effected while the engine is being driven.

BRIEF DESCRIPTION OF THE DRAWINGS

FIG. 1 is a sectional side view of a lawn mower of the prior art;

FIG. 2 is a sectional side view of the lawn mower comprising one embodiment of the invention;

DESCRIPTION OF THE PREFERRED EMBODIMENT

Figure 3:
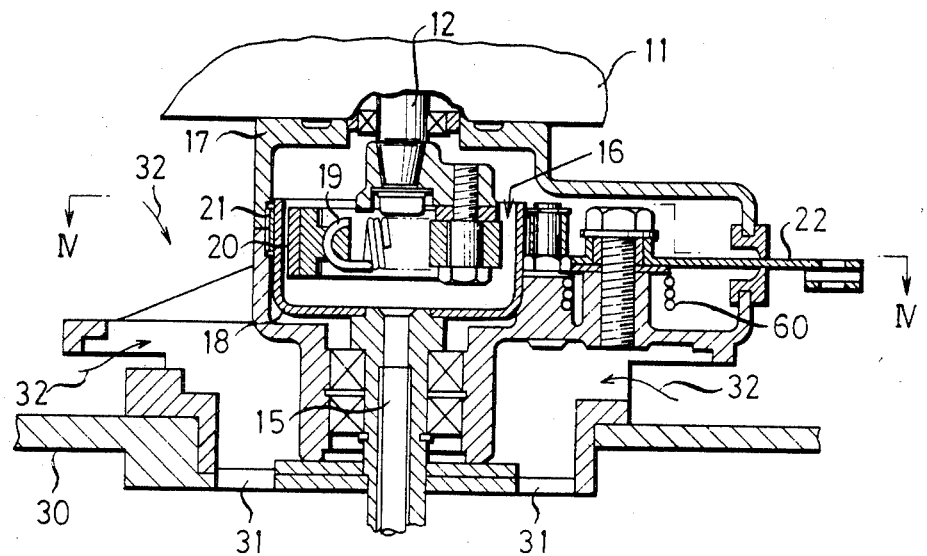
FIG. 3 is a view, on an enlarged scale, of the essential portions of the lawn mower shown in FIG. 2.

Before describing a preferred embodiment of the invention in detail, a lawn mower of the prior art will be outlined by referring to FIG. 1. An engine 1 has an output shaft 2 having an air impeller 3 and cutter blades 4 connected thereto. Upon actuation of the engine 1, the air impeller 3 and the cutter blades 4 rotate and the air impeller 3 draws air by suction through an air intake port 6 formed in a cover 5 and discharges air under high pressure, so that the lawn mower slightly floats in the air. While the lawn mower is in this condition, the grass on the ground 8 is cut by the cutter blades 4. In the aforesaid construction, the cutter blades 4 are directly connected to the output shaft 2 of the engine 1, and this makes it necessary to shut down the engine 1 to stop the rotation of the cutter blades 4. Thus it is impossible to effect adjustments of the cutter blades 4 during operation of the engine 1. As stated hereinabove, this invention has been developed for the purpose of obviating the aforesaid disadvantage of the prior art. The accompanying drawings show preferred embodiment of the invention.

Referring to FIG. 2, a two-cycle engine 11 has an output shaft 12 which is connected through a centrifugal clutch 16 to a driven shaft 15 having an air impeller 13 and a plurality of cutter blades 14 connected thereto. As clearly shown in FIGS. 3 and 4, the centrifugal clutch 16 comprises a casing 17, a drum 18 arranged in the casing 17 and mounted on an upper end portion of the driven shaft 15, and a clutch shoe 20 mounted on the output shaft 12 and expanding against the biasing force of a return spring 19.

Figure 4:
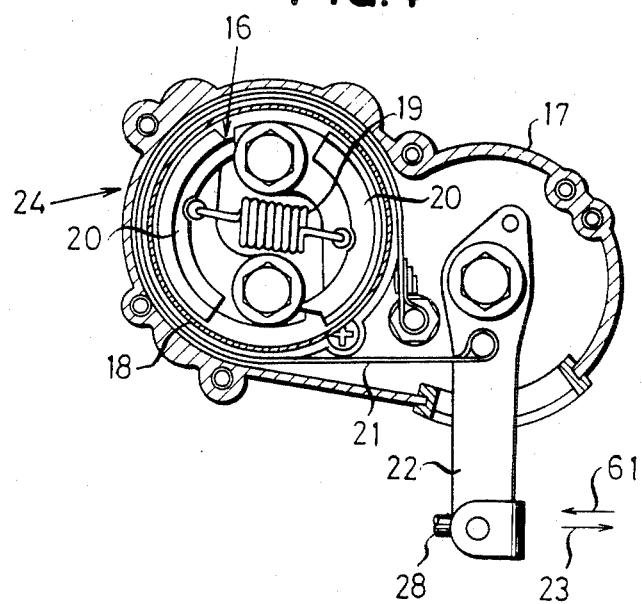
FIG. 4 is a sectional view taken along the line IV—IV in FIG. 3.

As shown in FIG. 4, a brake band 21 is wound around the outer periphery of the drum 18 of the centrifugal clutch 16, and a spring 60 is mounted (see FIGS. 2 and 3) to move an arm 22 in the direction of an arrow 23. Thus a brake device 24 is provided which applies the brake as the brake band 21 clamps against the drum 18. The brake device 24 is actuated by means of an operating section 26 mounted on a handle 25 shown in FIG. 2 and connected to a throttle mechanism, not shown, of the engine 11.

Figure 5:
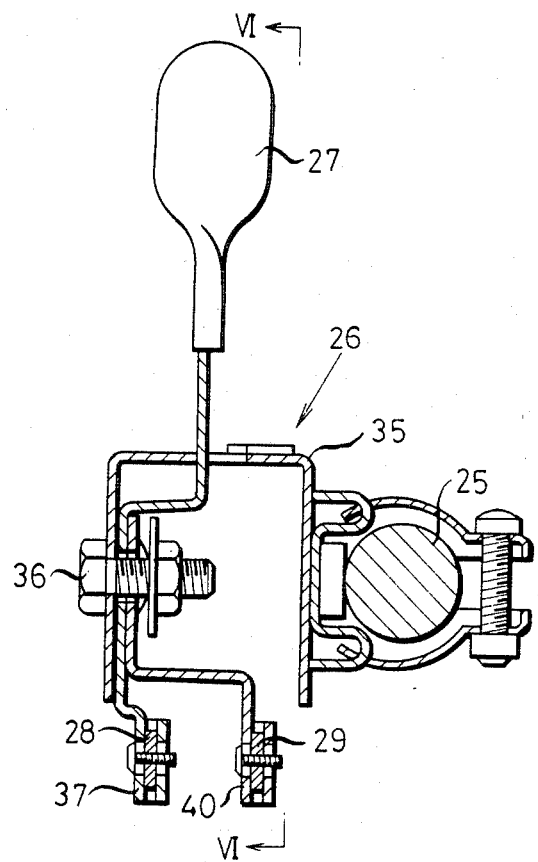
FIG. 5 is a vertical sectional view of other essential portions of the lawn mower shown in FIG. 2.
Figure 6:
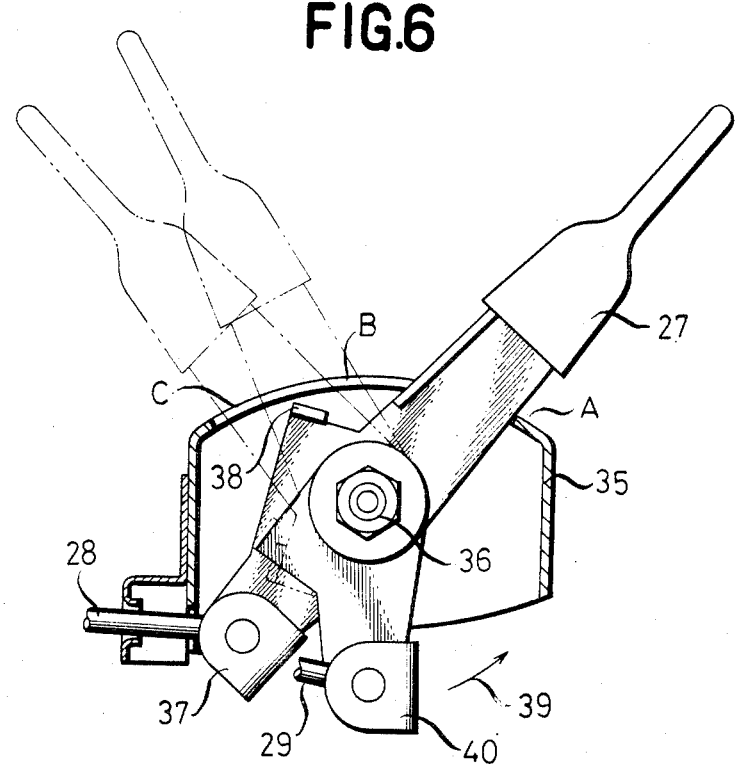
FIG. 6 is a sectional view taken along the line VI—VI in FIG. 5.

Referring to FIGS. 5 and 6, the operation section 26 comprises a case 35 attached to the handle 25, a control lever 27 bolted at 36 to the case 35 for pivotal movement, a brake arm 37 extending on a side of the bolt 36 opposite the side on which the control lever 27 extends and rotating as a unit with the control lever 27 about the bolt 36, and a throttle arm 40 adapted to move in pivotal movement in the direction of an arrow 39 in FIG. 6 as it is pressed by a pressing member 38 mounted on the brake arm 37. The brake arm 37 is connected through a wire 28 to the brake device 24, and the throttle arm 40 is connected through a wire 29 to the throttle mechanism. More specifically, the arm 22 shown in FIG. 4 moves in the direction of the arrow 23 as the control lever 27 shifts from position B to position A in FIG. 6, to thereby apply the brake. This brings a throttle valve, not shown, of the throttle mechanism to a closed position. Shifting of the control lever 27 from position A to position B moves the arm 22 in the direction of an arrow 61, to thereby open the brake and the throttle valve.

In FIG. 2, the numeral 30 designates a cover enclosing the floating fan 13 and the cutter blades 14 and formed with an air drawing aperture 31 at its upper portion. Air drawn through the air drawing aperture 31 by the air impeller 13 flows through a passage 32 in which the brake device 24 is mounted.

Operation of the lawn mower of the aforesaid construction will be described.

Figure 7:
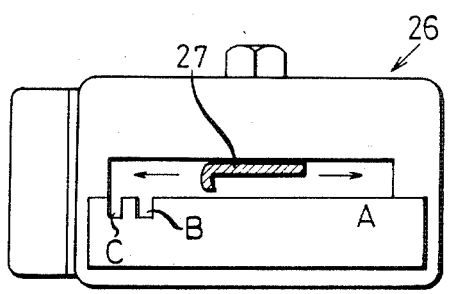
FIG. 7 is a plan view of FIG. 5.

When the engine 11 is actuated, the control lever 27 is not manipulated, and is held in position A shown in FIGS. 6 and 7 by the tension of the wire 28. At this time, the throttle is closed and the engine 11 idles, so that the clutch shoe 20 of the centrifugal clutch 16 shown in FIG. 4 is contracted inwardly by the biasing force of the spring, so that the centrifugal clutch 16 is disengaged and at the same time the brake band 21 clamps against the drum 18. Thus the brake is applied.

Shifting the control lever 27 to position B against the tension releases the brake band 21 of the break device 24 from clamping engagement with the drum 18, and at the same time the pressing member 38 of the brake arm 37 presses against the throttle arm 40 to move same in pivotal movement in the direction of the arrow 39. This slightly opens the throttle valve through the wire 29, to bring the engine to an intermediate speed rotation condition. Further shifting of the control lever 27 from position B to position C opens the throttle valve and brings the engine 11 to a high speed rotation condition. This allows the clutch shoe 20 to expand against the biasing force of the spring, and the clutch shoe 20 is connected to the drum 18, to rotate the air impeller 13 and the cutter blades 14. As a result, the lawn mower floats as a whole in the air as air is discharged under high pressure from the floating fan 13. While the lawn mower is in this condition, the grass on the ground 34 is cut with the cutter blades 14.

To render the lawn mower inoperative, the control lever 27 is moved to position A from between positions B and C. This actuates the brake device 24 and at the same time releases the throttle arm 40 from the pressing member 38 of the brake arm 37 pressing thereagainst, so that the throttle arm 40 is restored to the position shown in FIG. 5 and the throttle valve is closed. This reduces the rpm of the engine and disengages the clutch, bringing the engine to idling condition.

Thus when the control lever 27 is between positions A and B, the engine idles; when it is between positions B and C, the engine is rendered operative.

In the aforesaid construction, the provision of the centrifugal clutch 16 for connecting and disconnecting the output shaft 12 of the engine 11 and the driven shaft 15 and the brake device 24 for stopping the rotation of the cutter blades 14 linked to the control lever 27 enables adjustments of the cutter blades 14 to be readily effected by stopping the rotation thereof while the engine 11 is being driven.

The provision of the brake device 24 in the passage 32 for the air drawn by suction by the air impeller 13 through the air drawing aperture 31 formed in the cover 30 allows the brake device 24 to be cooled efficiently, so that deterioration of the brake band 21 by heat on account of repeated use of the brake device 24 can be avoided.

From the foregoing description, it will be appreciated that the invention enables, by virtue of the provision of the centrifugal clutch and the brake device, adjustments of the cutter blades to be readily effected while the engine is operating and cooling of the brake device can be effected efficiently.

What is claimed is:

1. A clutch brake mechanism for a lawn mower including an engine with an output shaft, a cover fixedly held relative to the engine, a driven shaft rotationally held by the cover and connected to the output shaft, cutter blades connected to the driven shaft, and an air impeller connected to the driven shaft above the cutter blades, comprising:

means for defining air passages situated in the center of the cover, said means rotationally supporting the driven shaft and having a plurality of air passages so that outer air is drawn into the inside of the cover by means of the air impeller for floating of the lawn mower, a casing mounted between the means for defining air passages and the engine, the output shaft and the driven shaft extending into the casing, a clutch situated in the casing and including a drum rotationally situated inside the casing and connected to the driven shaft, and at least two clutch shoes with a spring for urging the clutch shoes toward each other, said clutch shoes being connected to the output shaft of the engine so that when rotational speed of the output shaft increases, the clutch shoes move radially outwardly from the output shaft to contact the drum to thereby rotate the driven shaft, brake means situated in the casing and having a brake band disposed outside the drum and an arm pivotally connected to the casing, one end of the brake band being attached to the casing and the other end being attached to the arm so that no matter how many times the brake means is actuated by means of the arm for controlling rotation of the drum, the brake means in the casing is always cooled by air flowing into the inside of the cover through the air passages to thereby efficiently prevent brake damages due to heat, and a control lever including a brake arm connected to the arm of the brake means and a throttle arm connected to the engine for controlling rotational speed of the engine, said brake arm and throttle arm being linked together so that when the brake is applied to the drum, the engine operates at a minimum speed to thereby disengage the clutch shoes from the drum and to stop rotation of the drive shaft, and when the brake is not applied to the drum, the engine operates at at least a regular speed to thereby transfer rotational force of the engine to the driven shaft through the clutch.

* * * * *